Sept. 21, 1926.  J. A. CHISHOLM ET AL  1,600,318
TRACTOR HITCH
Filed March 18, 1926      2 Sheets-Sheet 1

Inventors
James A. Chisholm,
Marvin W. Turner.

By A. J. O'Brien
Attorney

Sept. 21, 1926.  
J. A. CHISHOLM ET AL  
1,600,318  
TRACTOR HITCH  
Filed March 18, 1926  2 Sheets-Sheet 2

Inventors  
James A. Chisholm,  
Marvin W. Turner.  
By  
Attorney

Patented Sept. 21, 1926.

1,600,318

UNITED STATES PATENT OFFICE.

JAMES A. CHISHOLM AND MARVIN W. TURNER, OF LYONS, COLORADO.

TRACTOR HITCH.

Application filed March 18, 1926. Serial No. 95,599.

This invention relates to improvements in tractor hitch devices of the type employed for connecting agricultural implements to tractors, as for example for securing plows in place. In the use of tractors for plowing it is quite necessary that the plows shall be properly connected to the tractor so that they will not slide past an obstruction as they usually do if they are secured to the tractor by means of a flexible connection. It is also necessary that the operator of the tractor shall be able to raise and lower the plows and to control the depth of the furrow. It is the object of this invention to provide means especially adapted for connecting plows to tractors which shall be of a simple construction and which can therefore be cheaply made and which has very few parts. It is a further object to so construct this device that it will prevent the side sway of the plow and which when in place will form with a tractor a unitary outfit. Our invention can be best described and will be most clearly understood when reference is had to the accompanying drawings in which the preferred embodiment thereof has been shown and in which:—

Figure 1:
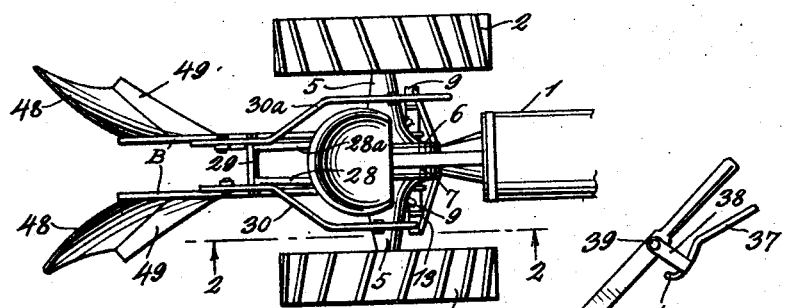
Figure 1 is a plan view of the rear part of a tractor showing a pair of two-way plows secured to the tractor by means of our improved hitch.
Figure 2:
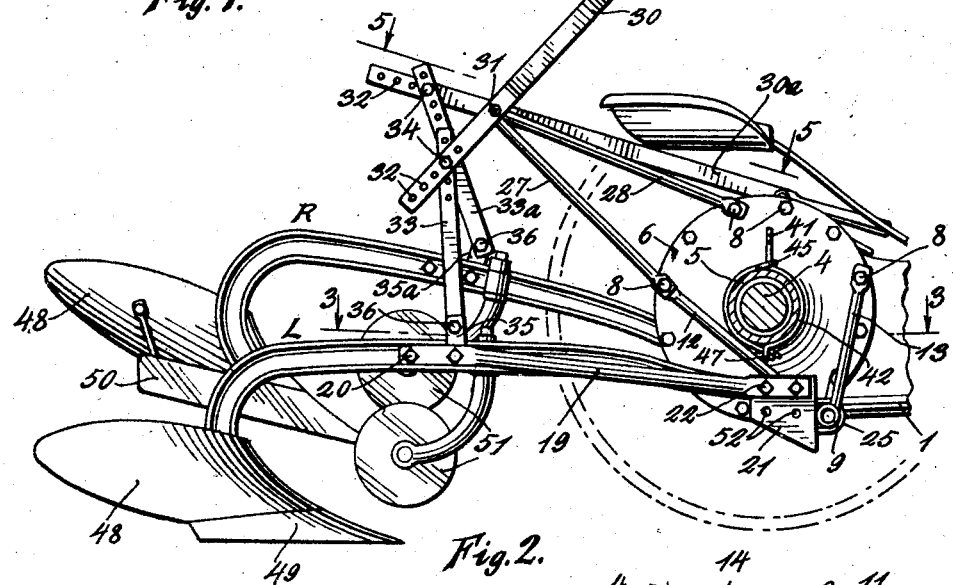
Figure 2 is a side elevation taken along line 2—2, Figure 1, and shows the parts to an enlarged scale.
Figure 3:
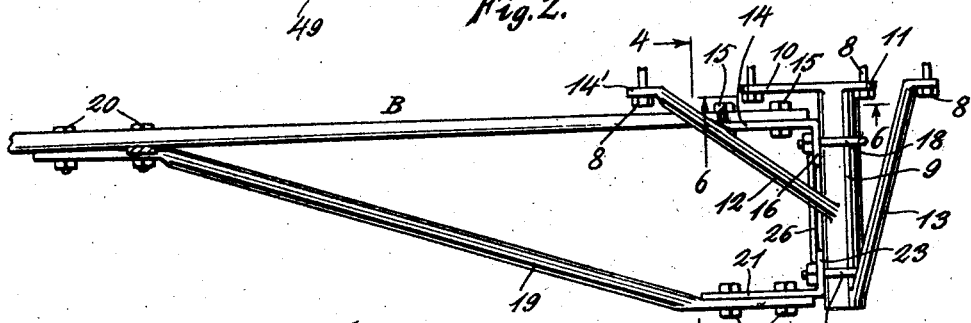
Figure 3 is a plan view looking downwardly along line 3—3, Figure 2, and shows the attaching means separate from the tractor.
Figure 4:
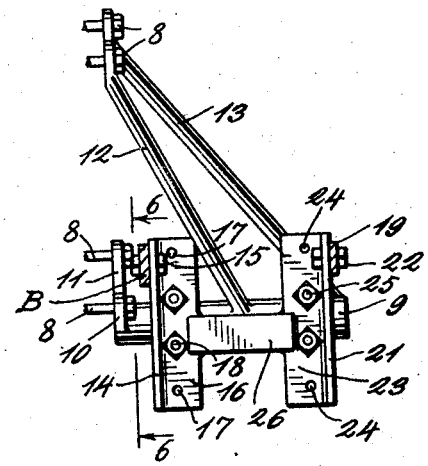
Figure 4 is a rear view taken along line 4—4, Figure 3.
Figure 6:
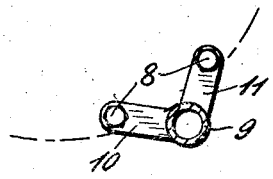
Figure 6 is a section taken on line 6—6, Figure 3.
Figure 7:
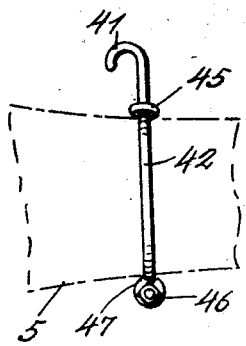
Figure 7 is a detailed view showing the manner in which the anchoring rod is secured to the axle casing of the tractor.

In the drawing numeral 1 represents the body of the tractor and numerals 2 and 3 the rear or driving wheels which are secured to the axle 4. The axle is enclosed in an axle housing which has been indicated by numeral 5 and which has an enlarged portion 6 at a point equidistant from its end. The enlarged part indicated by numeral 6 contains a differential gearing. The axle housing portions 5 are secured to the central cylindrical casting 7 by means of a plurality of bolts 8 in the manner shown in Figure 2. In the drawing the two plows have been indicated by letters R and L, one being a right hand and the other a left hand plow, such as are usually employed in connection with tractors where the plowing is done by going back and forth along the edge of the land that is being cultivated. For the purpose of attaching these plows to the tractor I have provided on each side of the differential housing, a cylindrical anchoring member 9 whose inner end is provided with two radially extending arms 10 and 11 in the manner shown most clearly in Figure 6. The ends of the arms 10 and 11 are provided with openings so spaced that they correspond to adjacent openings in the differential housing to which they are connected by means of the bolts 8. As the cylindrical member 9 is subjected to severe strains, it is necessary that it shall have additional bracing and we have therefore provided two additional brace members indicated respectively by reference numerals 12 and 13. The brace member 12 is welded or otherwise secured to the cylindrical member 9 at a point substantially half way between the ends thereof and is so inclined with respect to this cylindrical member, that its end 14 will come into contact with the outer flange of the differential housing to which it is secured by one of the bolts 8 in the manner shown in Figure 2. The other brace member 13 is secured to the cylindrical member near the outer end thereof and extends inwardly and forwardly to a point substantially diametrically across from the point where the brace member 12 comes into contact with the differential housing and is secured to the housing by the bolt 8. These parts have been so designed that the regular openings in the differential housing can be used in securing the parts in place so that they can be attached to the differential housing at any desired place rotatively. The position indicated in Figure 2 is considered to be the proper place for the location of this anchoring device. A similar anchoring device is secured to the differential casing on the other side thereof and serves for the attachment of the other plow. As these two devices are identical except that one is a right hand and the other is a left hand, this description will be restricted to one anchoring device. Each of the plows has a beam B to the end of which an angular plate 14 is secured by means of bolts 15. The flange 16 of the angular plate 14 is provided with four holes 17 that are spaced equal distances apart and through which the ends of the U bolt 18 extends. This U bolt is intended to encircle the cylindrical anchoring member 9 in the manner shown in Figures 2 and 3. A brace rod 19 is secured to the plow beam at one end by means of bolts 20 and extends forwardly and outwardly in the manner shown in Fig. 3. To the forward end of the brace rod an angle plate 21 is secured by means of bolts 22. The flange 23 of the angle plate 21 is also provided with four holes 24 that correspond to the holes 17 in the flange 16 and serve to receive the ends of the U bolt 25 which encircles the cylindrical member 9 in the manner shown in Figure 3. A connecting bar 26 has its ends welded to the flanges 23 and 16 in the manner shown in Figure 4 and in this manner a rigid triangular construction is obtained.

Figure 5:
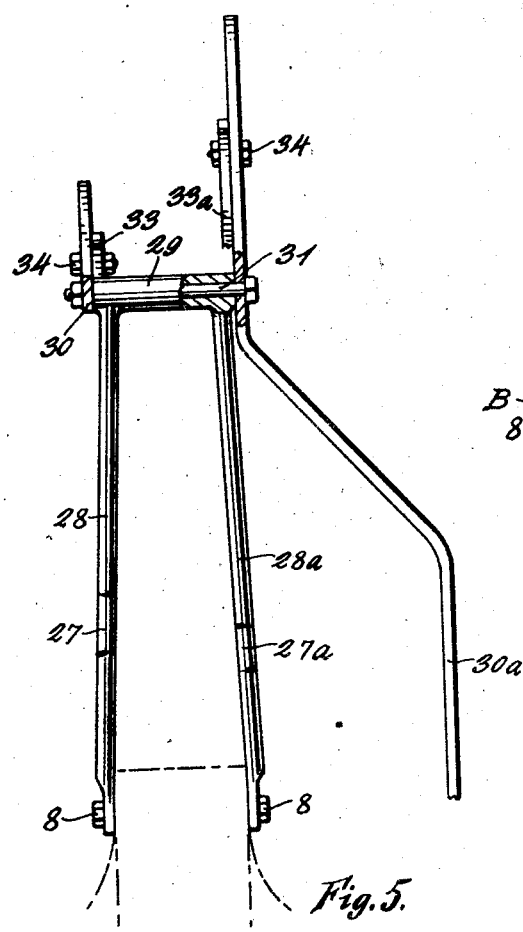
Figure 5 is a view looking downwardly along line 5—5, Figure 2.

It is evident that when the plow is attached in the manner shown and described, it can be rotated about the axis of the member 9, but can not be moved outwardly or inwardly because the rigid triangular structure formed by the brace rod 19, the beam B, the flanges 16, 23 and the connecting bar 26 will not bend and since this structure is secured to the cylindrical member 9 by means of the U bolts 18 and 25, it is evident that the plow will not have any side sway and will therefore not be thrown aside when it strikes some hard structure like a tough alfalfa root or some similar obstruction. It is now necessary to provide means for raising and lowering the plows and for this purpose I have provided a frame work consisting of four bars which have been indicated by reference numerals 27, 27ª, 28 and 28ª. The bars 27 and 28 form one pair whose ends are welded to one end of a tubular connecting member 29 and the corresponding bars 27ª and 28ª are connected to the other end of the tubular member 29 in the manner shown in Figure 5. The bars of each pair extend at an angle from each other and are secured at their ends to the differential housing by means of the bolts 8 in the manner indicated in Figures 2 and 5. This frame work is so attached that it projects rearwardly from the differential housing and terminates at a point directly above the plow beams. Two handles 30 and 30ª are pivoted to the end of the frame work by means of a bolt 31. The shorter ends of the levers are provided with a plurality of spaced openings 32 to which the links 33 and 33ª are connected by means of bolts 34. The lower ends of these links are connected to the upwardly extending lugs 35 and 35ª by means of bolts 36. It is evident that by rotating the levers about their pivot 31 that the plows can be raised and lowered. It is also evident that the depth to which the plow works can be controlled by properly adjusting the lengths of the links 33 and 33ª and this can be accomplished by utilizing different holes in the lever and in the links in the manner clearly apparent from the drawing. When one or more of the plows are to be raised so as to be inoperative, the lever that is connected to the plow that is to be raised is moved downwardly into the position occupied by the lever 30ª which raises the plow in the manner shown in Figure 2. It is of course necessary to provide some means for securing the lever in the position occupied by lever 30ª in Figure 2 and for this purpose the levers have each been provided with a catch comprising a handle 37 which is provided with two spaced arms 38 that are pivotally attached to the handle by means of the rivet 39. The handles also have a rearwardly projecting hook 40 which is adapted to engage underneath the hook 41 of the cooperating anchoring means carried by the axle housing and which comprises a rod 42 having a central curved portion that is adapted to lie against the exterior of the axial housing. Clamping rod 43 is provided at one end with a hook 45 and at the other with a threaded portion adapted to receive the nut 46; this clamping rod is put in place with the hook 45 engaging the upper end of the anchoring rod 42 and has its threaded portion extended through the eyelet 47 in the other end of the anchoring rod so that when the nut 46 is tightened, the parts will be firmly clamped to the axle housing. When the levers are moved forwardly and downwardly, the hooks 40 are moved into engagement with the hooks 41 securely holding the plow or plows in inoperative position. Since only one of these plows is in operative position at the same time, the other is of course held in inoperative position by means of the levers in the manner just described.

It is obvious from the above description that when the plows are connected to the tractor by our improved attaching means, they become with the tractor a unitary device which greatly facilitates the operation of turning and backing and which makes it possible to plow close to fences and greatly simplifies the operation of handling the plows and tractors.

The plows that have been shown form no part of my invention but merely represent conventional plows of the type extensively employed in connection with tractor plowing. Attention may be called, however, to the fact that numerals 48 indicate the mould boards, 49 the lay and 50 the landside of the plows while numeral 51 indicates the conventional rolling colter.

The depth to which the plows work can be regulated not only by means of the handles in the manner described, but by moving the U bolts up or down along the flanges 16 and 23 and in order to provide still greater adjustments the angle plates 14 and 21 are each provided with an additional set of holes 52 so that the bolts 15 and 22 may be passed through the openings 52 if this should be necessary for the purpose of obtaining the desired adjustment.

Having now described our invention what we claim as new is:—

1. In a device of the class described, in combination, a tractor having a differential housing, an anchor bar provided with integral brace members extending outwardly therefrom at various angles and means for securing the free ends of said brace members to the differential housing.

2. An anchoring device adapted to be secured to the differential housing of a tractor comprising a cylindrical body member having two arms extending radially at one end and two brace bars each having one end secured to the body member and the other located in the plane of the radial arms, the free ends of said brace bars and the radial arms being provided with openings for the reception of bolts by which they may be secured to a differential casing.

3. In combination with a tractor having a differential housing provided with a circular row of clamping bolts, of an anchoring device consisting of a cylindrical anchoring member having two arms extending radially from one end, said arms lying in a plane perpendicular to the axis of the anchoring member and provided at their ends with openings adapted to receive anchoring bolts and two brace bars having one end integrally attached to said anchoring member and having their axes angularly related to the axis of the tubular member, the free ends of said brace bars lying in the plane of the radial arms and provided with openings for the reception of clamping bolts.

4. In an implement hitch for securing agricultural implements to tractors having a rear axle housing and a differential housing, a cylindrical anchoring member provided with means for rigidly attaching it to the differential housing, means for securing an implement to said anchoring member and means comprising a brace member for preventing side sway.

5. A tractor plow comprising, in combination, a tractor having a differential housing which forms part of the rear axle housing, an anchoring member rigidly secured to said differential housing and extending parallel with the axis of the axle housing, means for pivotally attaching a plow to said anchoring member, means comprising a brace member for preventing side sway of said plow, a frame work having one end secured to the differential housing and the other extending rearwardly over the plow, a lever pivoted to the end of the frame work, a link connecting one end of said lever with the plow beam whereby the plow can be raised and lowered by tilting the lever and means for locking the lever with the plow in inoperative position.

6. A tractor plow comprising, in combination, a tractor having a differential housing which forms part of the rear axle housing, an anchoring member rigidly secured to said differential housing and extending parallel with the axis of the axle housing, means for pivotally attaching a plow to said anchor member, means comprising a brace member for preventing side sway of said plow, a frame work comprising four bars forming two pairs, one end of said pair being secured to a tubular member and the other end of each pair being connected to one side of the differential housing, a lever pivoted to the tubular member, a link connecting one end of the lever with a plow beam and a locking means secured to the other end of the lever for holding the same in position for raising the plow.

In testimony whereof we affix our signatures.

JAMES A. CHISHOLM.
MARVIN W. TURNER.